June 15, 1965 H. A. VON PECHMANN 3,189,038
VARIABLE FLOW CLAMP FOR FLEXIBLE TUBING
Filed June 8, 1962
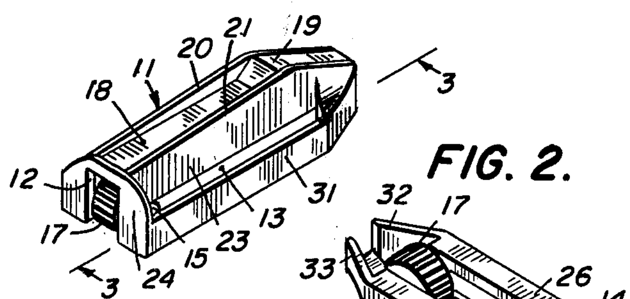
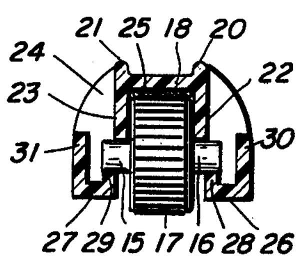
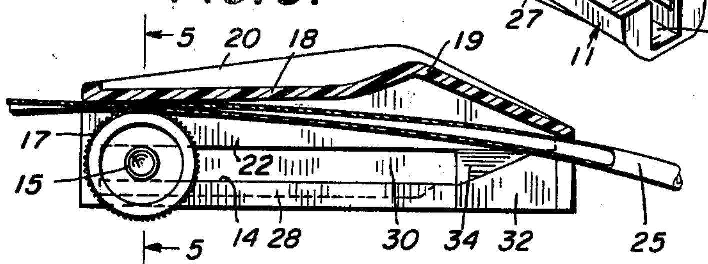
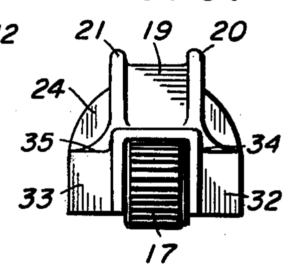
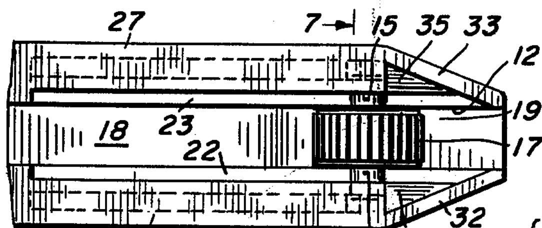
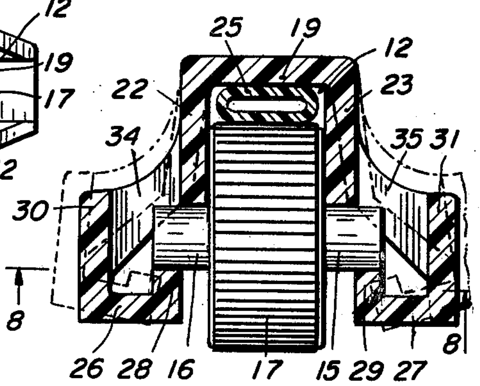
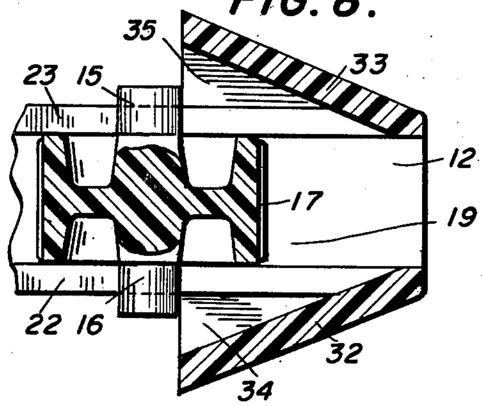
INVENTOR
HEINZ A. VON PECHMANN
BY Robert T. Merrick 3,189,038

VARIABLE FLOW CLAMP FOR FLEXIBLE TUBING

Heinz A. von Pechmann, Lake View Terrace, Calif., assignor to Don Baxter, Inc., Glendale, Calif., a corporation of Nevada Filed June 8, 1962, Ser. No. 201,193
9 Claims. (Cl. 137—315)

This invention relates to a roller clamp and more particularly to a roller clamp adapted for hospital use to vary or shut off the flow through flexible tubing which forms a part of an administration set, such as those used for intravenous infusions, blood transfusions and similar applications in which the flow rate must be carefully controlled.

Many different types of roller clamps and screw clamps have been utilized for this purpose, but each of these previous clamps has certain disadvantages during use, or in assembling with the tubing for use in an administration set, or in removing the clamp from the administration set and mounting it on a second set. In many cases, the roller clamps or screw clamps previously used could not be shut off completely and the flow rate changed over a period of time at any set position. Furthermore, with many screw clamps, it is necessary to use two hands for operation and adjustment, and in many cases operation or changing adjustment of a screw type clamp may result in movement of the needle at the end of the tubing, which would be very painful to the patient, or an accidental removal of the needle which would require reinsertion with great discomfort to the patient. Accidental removal of the needle or separation of the tubing from other parts of the set may also lead to the introduction of air into the veins which would be extremely dangerous to the patient.

Briefly stated, one preferred embodiment of the roller clamp of the present invention is preferably formed of plastic and has a knurled roller with stub shafts extending axially on opposite sides thereof and a body portion which is provided with a longitudinal channel having an open side, and side walls having opposed longitudinal slots for receiving the end portions of the stub shafts for rolling engagement therewith. The longitudinal channel has an inclined bottom wall with a portion which slopes gradually toward one end of the body and a V-shaped portion which slopes steeply towards the opposite or nose end of the body. The flexible plastic tubing is positioned in the bottom of the channel, so that the roller will engage and squeeze down the tubing against the gradually sloping bottom wall portion to control the flow therethrough with a high degree of accuracy. Any adjusted position is securely held, since the bottom of the channel. Furthermore, a slight flexibility in the sidewalls of the channel above the slots tends to compensate for the flexibility and slow cold flow of the flexible plastic tubing, so as to minimize any gradual change in flow rate due to said cold flow.

The other side of the roller extends through the open side of the channel, and may be readily rolled or manipulated with the thumb, while the body of the clamp is held in one hand. By moving the roller to the end of the slot opposite the nose end, the flexible tubing is squeezed down against the gradually sloping portion of the inclined bottom wall to completely shut off the flow of fluid through the tubing. Movement of the roller toward the nose end will bring it to a stop against the edges of opposed sloping surfaces forming a mount adjacent the partially open end of the slots in which the stub shafts roll. In this position the bottom of the roller is substantially spaced from the V-shaped portion of the inclined bottom wall, and the tubing is open to substantially full free flow. The edges of the sloping surfaces prevent accidental removal of the roller, which might be easily lost. But a hard pressure by the finger on the roller toward the nose end of the body will snap the roller out of the slot by flexing the walls of the body outwardly as the ends of the stub shafts roll over the edges of the sloping surfaces with some assistance from the knurled periphery of the roller biting into the tubing, which at this position rests against the sharply inclined, V-shaped portion of the bottom wall. The roller is also inserted in the opening or mouth formed by the sloping walls at the nose portion, and by pressing it downwardly and rearwardly with sufficient force, it will snap into the slots on opposite sides of the longitudinal channel.

One object of the present invention is to provide a roller clamp for hospital use with flexible tubing such as is used in conjunction with parenteral infusion sets wherein the rate of flow through the tubing may be accurately controlled or completely shut off, as desired.

Another object of the present invention is to provide a roller clamp which may be readily assembled with a piece of flexible tubing assembled in an administration set without the necessity of inserting and threading the tubing through the clamp.

A still further object of the present invention is to provide a roller clamp wherein the roller is normally retained in slots in the side walls of the body, but may be readily removed when desired by applying additional pressure against the roller, whereby it may be snapped out of the open ends of the slots into the mouth at the nose end of the body portion, and may also be readily reinserted by a similar movement in the opposite direction.

Other objects and many of the attending advantages of this invention will be readily appreciated as the same becomes better understood by reference to the following detailed description when considered in connection with the accompanying drawings wherein:

FIGURE 1 is a pictorial view illustrating one preferred embodiment of the roller clamp of the present invention locking at the bottom side thereof;

FIGURE 2 is a pictorial view of the roller clamp of FIGURE 1 looking at the top side thereof, with the roller at the opposite end of the channel adjacent the mouth in the nose end of the body, where the roller may be inserted and removed with a snap action;

FIGURE 3 is an enlarged longitudinal sectional view taken on the line 3—3 of FIGURE 1;

FIGURE 4 is a top plan view of the roller clamp as shown in FIGURE 3 with the roller in the forward position adjacent the mouth in the nose end of the body;

FIGURE 5 is a cross-sectional view taken on the line 5—5 of FIGURE 3;

FIGURE 6 is an end view taken from the right side of FIGURE 3;

FIGURE 7 is a cross-sectional view on a further enlarged scale taken on the line 7—7 of FIGURE 4 and showing in phantom lines the manner in which the roller flexes the side walls of the body when snapped out of the slots; and FIGURE 8 is a partial detailed sectional view taken on the line 8—8 of FIGURE 7.

Referring now to the drawings in detail and more particularly to FIGURES 1 and 2, the roller clamp illustrating one preferred embodiment of the present invention has an elongated generally boat-shaped body 11 having a longitudinal channel 12 extending therethrough and provided with opposed slots 13 and 14 in which the stub shafts 15 and 16 of the knurled roller 17 are mounted.

Further details of the body 11 and the roller 17 are also shown in the enlarged views of FIGURES 3, 4, 5, and 6. Referring particularly to FIGURES 1 and 3, the wall forming the bottom of channel 12 is inclined with respect to the slots 13 and 14 and has a gradually sloping section 18 integrally formed with a V-shaped portion 19 which slopes steeply towards the nose end of the body to perform various functions which will be described subsequently.

The bottom wall of the channel 12 is strengthened and rigidified by the two ribs 20 and 21 which extend from and form an integral portion of the side walls 22 and 23. The side walls 22 and 23 fit tightly against and firmly engage the edges of roller 17 to hold the roller in its adjusted position for controlling the rate of flow through the flexible tubing 25.

The upper portions 26 and 27 of the side walls forming the channel 12 are spaced outwardly with respect to the lower wall portions 22 and 23 and with respect to the upper portion of the roller 17, providing a substantial space therebetween. The upper wall portions 26 and 27 are actually channel shaped in cross-section with the inner flanges 28 and 29 providing the upper edges of the slots 13 and 14 and the outer flanges 30 and 31 serving to reinforce this portion of the body. A rear wall 24 interconnects the bottom wall 18 of the channel 12 and the side walls 22 and 23, as well as the channel shaped upper wall portions 26 and 27 with the inner flanges 28 and 29 and the reinforcing flanges 30 and 31, and also serves as a stop closing the ends of the slots 13 and 14 which prevents further movement of the roller in this direction.

The rear wall 24 has a rectangular cut out portion at the end of channel 12 which permits a portion of the roller to extend therethrough in the extreme rearward position of the roller, where the tubing is pinched down to a cut off position which prevents flow of any fluid through the plastic tubing 25, when the roller is in the position shown in FIGURES 1, 3, and 5.

The forward or nose portion of the body has two tapered side walls 32 and 33 which converge towards the end of the steeply sloped portion of the bottom wall 19, and these walls help to give the body 11 its generally boat-shaped appearance.

The inclined wall portions 34 and 35 are integrally formed and joined to the tapered walls 32 and 33 and to the side walls 22 and 23 of the channel 12, and the edges of the inclined wall portions 34 and 35 extend diagonally across the ends of the slots 14 and 13 to form a stop which engages the stub shafts 16 and 15 on the roller 17. The sloping surfaces on inclined wall portions 34 and 35 are clearly shown in FIGURES 3, 4, 7, and 8, but may be concavely or convexly curved rather than flat surfaces, as shown, and need not necessarily taper toward the nose in the manner illustrated.

FIGURES 7 and 8 particularly illustrate the manner in which the stub shafts 15 and 16 on the roller 17 engage the edges of the sloping walls 35 and 34 which extend across the open ends of the slots 13 and 14 to prevent further movement of the roller 17 in the channel 12, unless and until sufficient pressure is exerted on the roller to force the stub shafts 15 and 16 to roll over the edges and onto the sloping surfaces of inclined wall portions 34 and 35 and thus press upwardly on the ends of the inner flanges 28 and 29 to deform the upper side walls 26 and 27 outwardly, as illustrated in FIGURE 7, thus permitting the roller 17 to snap out of the slots into the mouth formed by the sloping surfaces 34 and 35 together with the tapered walls 32 and 33. Pressure from the thumb on the upper side walls 26 and 27 in back of the roller 17 also helps to distort and spread the side walls, and thus assists in snapping out the roller.

When the roller is assembled with the body 11 and a piece of flexible plastic tubing 25, the tubing 25 is inserted in the bottom of the channel 12 in the body 11, and the roller is inserted into the mouth adjacent the nose of the body portion. By forcing the roller 17 downwardly and rearwardly against the sloping surfaces of walls 34 and 35, the upper side walls 26 and 27 are again spread to permit the roller to snap into the channel 12 with the stub shafts 15 and 16 positioned in the slots 13 and 14. This action is particularly convenient when assembling the roller clamp on a piece of flexible tubing which forms a part of an administration set, but may be also used to reinsert the roller, after it has been removed in order to transfer the roller clamp to another set for infusion of parenteral solutions or transfusion of blood.

It will be apparent that, when the roller is positioned at the forward ends of the slots 13 and 14 with the bottom of the roller adjacent the lowest portion of the V-shaped bottom wall 19, the tubing 25 will be substantially open for free flow of fluid therethrough, and, when the roller is moved towards the rear closed ends of the slots 13 and 14, the flexible tubing 25 is progressively flattened to gradually cut down the flow of fluid therethrough, and at the rearward ends of the slots 13 and 14 the tubing is completely compressed, as illustrated in FIGURE 5, and the flow of fluid therethrough is completely cut off.

During the movement of the roller out of the forward ends of the slots 13 and 14 as described previously, the engagement of the knurled surface on the roller 17 against the flexible tubing 25 further assists in the rolling action and forward movement by which the roller 17 is readily snapped out of the slots into the open mouth formed by the sloping surfaces 34 and 35 to permit easy removal of the roller 17 from the body 11 when desired.

It will be apparent that the shape of the body 11 may be varied considerably from that shown, and particularly the configuration of the mouth and the nose portion of the body forward of the open ends of the slots 13 and 14, and the particular shape, contours, and arrangement of the sloping surfaces 34 and 35 may be varied considerably, as long as the roller 17 is normally retained in the slots 13 and 14 and may be snapped out of and back into the slots through the open mouth.

As indicated in the previous description, body 11 must be made of a somewhat flexible, resilient material so that it can be easily distorted to allow roller 17 to snap out of the slots as shown in FIGURE 7, but will then return to its original shape. For this purpose, many commonly available plastic materials are suitable, such as linear polyethylene, polypropylene, and high-impact polystyrene.

However, I have found that when tubing 25 is made of a flexible plastic, such as polyvinyl chloride, it is desirable to make body 11, and particularly the upper wall portions 26 and 27, of plastic materials having intermediate flexibility, that is, semirigid materials. The reason for this is that after roller 17 is set to adjust the flow through tubing 25, the rate of flow undesirably decreases, apparently due to relaxation or cold flow of the flexible plastic tubing. By constructing upper side wall members 26, 27 of materials having intermediate flexibility, such as linear polyethylene or polypropylene, these side wall members will be bent or distorted when the initial setting is made. Then as tubing 25 relaxes or cold flows, the upper side wall members 26, 27 likewise relax or cold flow to compensate for the change in the tubing, so as to minimize any decrease in flow rate through the tubing. It should be noted that for this purpose polystyrene is too rigid, while regular or low density polyethylene is too flexible. Thus, it is a part of the teaching of my invention to design upper side wall members 26 and 27 to have a suitable configuration and to be made of a suitable material so that they bend or distort and thereby compensate for changes in the flow rate due to relaxation or cold flow of plastic tubing 25.

Obviously, many other modifications and variations of the present invention may be made within the scope of the following claims.

What is claimed is:

1. A roller clamp comprising a roller with stub shafts, a flexible, resilient body having a bottom wall and side walls with slots in said side walls inclined with respect to said bottom wall, which slots are closed at one end and partially open at an opposite end of said body, and a mouth between said side walls entering into said slots, said mouth having sides sloping inwardly and downwardly across the partially open ends of said slots toward said bottom wall, which sides are positioned to coact with the stub shafts of said roller to cam the side walls of said body apart for insertion and removal of said roller with a snap action.

2. A roller clamp comprising a roller with axial stub shafts, and an elongated body portion having bottom and side walls of a resilient and flexible plastic material defining a longitudinal channel therethrough, opposed longitudinal slots formed in said side walls, said slots being closed at one end and partially open at the opposite end of said body, a portion of said bottom wall sloping toward the closed end of said slots, the opposite end of said body having side walls extending beyond the ends of said slots and having downwardly and inwardly sloping surfaces positioned to coact with the stub shafts of said roller to cam the side walls at said opposite end of said body portion apart for insertion and removal of said roller, said surfaces forming a mouth adjacent the partially open ends of said slots, the sloping surfaces of said side walls extending across the partially open ends of said slots for engaging the stub shafts on said roller and limiting movement thereof in said slots, whereby said roller may be inserted and removed from said slots through said mouth with a snap action when sufficient force is applied to said roller.

3. A roller clamp as set forth in claim 2 wherein the upper portion of said side walls is formed in a channel-shape section having sufficient flexibility and resilience to compensate for the slow cold flow of a section of flexible tubing adapted to be inserted in said channel.

4. A roller clamp as set forth in claim 2 wherein the lower portion of said side walls adjacent the sloping portion of said bottom wall firmly engages the lower portion of said roller contiguous thereto to resist movement of said roller from its adjusted position in said slots.

5. A roller clamp comprising a roller having stub shafts extending axially on opposite sides thereof, and a body portion provided with a longitudinal channel having opposed longitudinal slots in the side walls thereof for receiving the end portions of the stub shafts on said roller for rolling engagement therewith, said longitudinal channel having a bottom wall with a portion which slopes gradually with respect to said slots toward one end of the body and another portion which slopes steeply towards the opposite nose end of the body, said nose end of the body having side walls with surfaces positioned to coact with the stub shafts of said roller to cam said side walls at the nose end apart for insertion and removal of said roller, said surfaces sloping downwardly and forming a mouth adjacent the open end of said slots, the opposite end of said slots adjacent said one end of said body being closed to limit movement of said roller in one direction, the edges of said surfaces extending partially across the open end of said slots and adapted to engage the outer ends of said stub shafts to prevent accidental removal of said roller through the open ends of said slots, said body portion being formed of a flexible and resilient material whereby said roller may be forced out of the open end of said slots by flexing the walls of said body as the ends of said stub shafts roll over the edges of said sloping surfaces for removal and reinsertion of said roller through the mouth formed at the nose portion of said body.

6. A roller clamp comprising a roller having stub shafts extending axially on opposite sides thereof, and a body portion provided with a longitudinal channel having opposed longitudinal slots in the side walls thereof for receiving the end portions of the stub shafts on said roller for rolling engagement therewith, said longitudinal channel having an inclined bottom wall with a portion which slopes gradually toward one end of the body and another portion which slopes steeply towards the opposite nose end of the body, said nose end of the body having side walls extending toward the end of the channel and downwardly sloping surfaces positioned to coact with the stub shafts of said roller to cam said side walls at said nose end apart for insertion and removal of said roller, said surfaces forming a mouth adjacent the open end of said slots, the opposite end of said slots adjacent said one end of said body being closed to limit movement of said roller in one direction, the edges of said sloping surfaces extending in one direction, the edges of said sloping surfaces extending diagonally across the open end of said slots and adapted to engage the outer ends of said stub shafts to prevent accidental removal of said roller through the open ends of said slots, said body portion being formed of a flexible and resilient material whereby said roller may be forced out of the open end of said slots by flexing the walls of said body as the ends of said stub shafts roll over the edges of said sloping surface for removal and reinsertion of said roller through the mouth formed at the nose portion of said body.

7. A roller clamp comprising a knurled roller having stub shafts extending axially on opposite sides thereof, and a body portion provided with a longitudinal channel having opposed longitudinal slots in the side walls thereof for receiving the end portions of the stub shafts on said roller for rolling engagement therewith, said longitudinal channel having an inclined bottom wall with a portion which slopes gradually toward one end of the body and a V-shaped portion which slopes steeply towards the opposite nose end of the body, said nose end of the body having tapered side walls converging toward the nose end of the channel and downwardly sloping surfaces positioned to coact with the stub shafts of said roller to cam the side walls at said nose end of said body portion for insertion and removal of said roller, said surfaces forming a mouth adjacent the open end of said slots, the opposite end of said slots adjacent said one end of said body being closed to limit movement of said roller in one direction, the edges of said sloping surfaces extending diagonally across the open end of said slots and adapted to engage the outer ends of said stub shafts to prevent accidental removal of said roller through the open ends of said slots, said body portion being formed of a flexible and resilient material whereby said roller may be forced out of the open open end of said slots by flexing the walls of said body as the ends of said stub shafts roll over the edges of said sloping surfaces for removal and reinsertion of said roller through the mouth formed at the nose portion of said body.

8. A roller clamp for varying the flow of fluid in flexible tubing comprising a knurled roller having stub shafts extending axially on opposite sides thereof, and a body portion provided with a longitudinal channel having opposed longitudinal slots in the side walls thereof for receiving the end portions of the stub shafts on said roller for rolling engagement therewith, said longitudinal channel having an inclined bottom wall with a portion which slopes gradually toward one end of the body and a V-shaped portion which slopes steeply towards the opposite nose end of the body, said nose end of the body having tapered side walls converging toward the nose end of the channel and downwardly sloping surfaces positioned to coact with the stub shafts of said roller to cam the side walls at said nose end of said body portion for insertion and removal of said roller, said surfaces forming a mouth adjacent the open end of said slots, the opposite end of said slots adjacent said one end of said body being closed to limit movement of said roller in one direction, the edges of said sloping surfaces extending diagonally across the open end of said slots and adapted to engage the outer ends of said stub shafts to prevent accidental removal of said roller through the open ends of said slots, said body portion being formed of a flexible and resilient material whereby said roller may be forced out of the open end of said slots by flexing the walls of said body as the ends of said stub shafts roll over the edges of said sloping surfaces for removal and reinsertion of said roller through the mouth formed at the nose portion of said body, and the upper side walls of said body above said slots flex slowly to compensate for the slow cold flow of said tubing to maintain a substantially constant drip rate.

9. A roller clamp comprising a knurled roller having stub shafts extending axially on opposite sides thereof, and a body portion provided with a longitudinal channel having opposed longitudinal slots in the side walls thereof for receiving the end portions of the stub shafts on said roller for rolling engagement therewith, said longitudinal channel having an inclined bottom wall with a portion which slopes gradually toward one end of the body and a V-shaped portion which slopes steeply towards the opposite nose end of the body, said nose end of the body having tapered side walls converging toward the nose end of the channel and downwardly sloping surfaces positioned to coact with the stub shafts of said roller to cam the side walls at said nose end of said body portion for insertion and removal of said roller, said surfaces forming a mouth adjacent the open end of said slots, the opposite end of said slots adjacent said one end of said body being closed to limit movement of said roller in one direction, the edges of said sloping surfaces extending diagonally across the open end of said slots and adapted to engage the outer ends of said stub shafts to prevent accidental removal of said roller through the open ends of said slots, said body portion being formed of a flexible and resilient material whereby said roller may be forced out of the open end of said slots by flexing the walls of said body as the ends of said stub shafts roll over the edges of said sloping surfaces for removal and reinsertion of said roller through the mouth formed at the nose portion of said body, and whereby said side walls adjacent the bottom of said channel tightly engage the edges of said roller to maintain a preset adjustment of the drip rate.

References Cited by the Examiner

UNITED STATES PATENTS

| | | | |
|---|---|---|---|
| 1,330,523 | 2/20 | Evitts | 251—6 |
| 1,959,074 | 5/34 | Bloxsom | 251—6 |
| 2,595,511 | 5/52 | Butler | 251—6 |
| 2,889,848 | 6/59 | Redmer | 137—315 |
| 3,135,259 | 6/64 | Evans | 128—214 |

ISADOR WEIL, *Primary Examiner.*